(12) United States Patent
Huang et al.

(10) Patent No.: US 11,598,990 B2
(45) Date of Patent: Mar. 7, 2023

(54) DIRECT TYPE BACKLIGHT MODULE AND DISPLAY DEVICE

(71) Applicant: SHENZHEN TCL NEW TECHNOLOGY CO., LTD., Shenzhen (CN)

(72) Inventors: Xiaocheng Huang, Shenzhen (CN); Shaojun Cai, Shenzhen (CN); Jianjun Sun, Shenzhen (CN)

(73) Assignee: SHENZHEN TCL NEW TECHNOLOGY CO., LTD., Shenzhen (CN)

( * ) Notice: Subject to any disclaimer, the term of this patent is extended or adjusted under 35 U.S.C. 154(b) by 497 days.

(21) Appl. No.: 16/610,642

(22) PCT Filed: Nov. 17, 2017

(86) PCT No.: PCT/CN2017/111479
§ 371 (c)(1),
(2) Date: Nov. 4, 2019

(87) PCT Pub. No.: WO2018/223615
PCT Pub. Date: Dec. 13, 2018

(65) Prior Publication Data
US 2020/0064693 A1    Feb. 27, 2020

(30) Foreign Application Priority Data

Jun. 6, 2017 (CN) .......................... 201720654705.4

(51) Int. Cl.
*G02F 1/13357* (2006.01)
*G02F 1/1335* (2006.01)

(52) U.S. Cl.
CPC .. *G02F 1/133608* (2013.01); *G02F 1/133605* (2013.01); *G02F 1/133606* (2013.01); *G02F 1/133607* (2021.01)

(58) Field of Classification Search
CPC ......... G02F 1/133608; G02F 1/133605; G02F 1/133606; G02F 1/133607
(Continued)

(56) References Cited

U.S. PATENT DOCUMENTS

| 8,847,861 B2 * | 9/2014 | Kimura ................ G09G 3/2022 345/84 |
| 2004/0189557 A1 * | 9/2004 | Noro ......................... G09G 3/32 345/82 |
| 2015/0261034 A1 | 9/2015 | Koyama et al. |

FOREIGN PATENT DOCUMENTS

| CN | 104570429 A | 4/2015 |
| CN | 105223716 A | 1/2016 |

(Continued)

OTHER PUBLICATIONS

International Search Report, dated Mar. 15, 2018, for Shenzhen TCL Newtechnology Co., Ltd, International Application No. PCT/CN2017/111479, Filed Nov. 17, 2017.
(Continued)

*Primary Examiner* — Britt D Hanley
*Assistant Examiner* — Hana S Featherly
(74) *Attorney, Agent, or Firm* — Law Offices of Albert Wai-Kit Chan, PLLC (57) ABSTRACT

The present disclosure provides a direct type backlight module (1) and a display device. The direct type backlight module (1) includes: a back plate (10) including a body (110) and a side plate (120) protruding around an edge of the body (110), the body (110) and the side plate (120) are enclosed to form a receiving cavity (100), and a back surface of the body (110) is partially recessed towards the receiving cavity (100) to form a mounting groove (130); and a rear housing (20), covering the mounting groove (130), a back surface of the rear housing (20) is flush with an edge of the mounting groove (130) of the body (110). The direct type
(Continued)

backlight module (1) overcomes the defect in the conventional display device that the rear housing protrudes from the back plate, causing uneven thickness of the display device.

20 Claims, 7 Drawing Sheets

(58) Field of Classification Search
USPC .......................................................... 362/257
See application file for complete search history.

(56) References Cited

FOREIGN PATENT DOCUMENTS

| | | | |
|---|---|---|---|
| CN | 105242429 A | 1/2016 |
| CN | 106292021 A | 1/2017 |
| CN | 106526959 A | 3/2017 |
| CN | 106647021 A | 5/2017 |
| TW | 201101267 A | 1/2011 |

OTHER PUBLICATIONS

Written Opinion, dated Mar. 15, 2018, for Shenzhen TCL Newtechnology Co., Ltd, International Application No. PCT/CN2017/111479, Filed Nov. 17, 2017.

\* cited by examiner

DIRECT TYPE BACKLIGHT MODULE AND DISPLAY DEVICE

FIELD

The present disclosure relates to the technical field of display devices, in particular to a direct type backlight module and a display device.

BACKGROUND

People are of increasingly demanding of display devices such as televisions and computer monitors as the improvement of living standards. Generally, the display devices adopt two types of the backlight modules, namely, a side type backlight module and a direct type backlight module. The back side of the back plate of the direct type backlight module is usually flat. After the movement, the circuit board, and the rear housing are disposed on the back side of the back plate, the rear housing protrudes from the back plate, thereby causing uneven thickness of the display device and leading to a lot of inconvenience when user places the display device against the wall. On the other hand, the thickness of the display device is uneven, which also leads to a poor appearance, resulting in a fatigue aesthetic of the user.

SUMMARY

The main purpose of the present disclosure is to provide a direct type backlight module, aiming to solve the defect that the rear housing of the conventional display device protrudes from the back plate, resulting in uneven thickness of the display device.

In order to achieve the above objective, the present disclosure provides a direct type backlight module applied to a display device, the direct type backlight module includes:

a back plate, including a body and a side plate protruding around an edge of the body, the body and the side plate are enclosed to form a receiving cavity, and a back surface of the body is partially recessed towards the receiving cavity to form a mounting groove; and a rear housing, covering the mounting groove, and a back surface of the rear housing is flush with an edge of the mounting groove of the body.

Preferably, the body includes a first sub back plate, a connecting plate and a second sub back plate connected sequentially, the first sub back plate is parallel to the second sub back plate, an angle between the first sub back plate and the connecting plate is an obtuse angle, and the second sub back plate is a bottom plate of the mounting groove.

Preferably, the direct type backlight module further includes a first light source module disposed on the first sub back plate and a second light source module disposed on the second sub back plate, a luminance of the first light source module is greater than that of the second light source module.

Preferably, the first light source module includes a first reflective sheet and a plurality of first light strips mounted on the first sub back plate, the first reflective sheet is provided with a plurality of first through holes, each first through hole corresponds to one light bead on the first light strips;

the second light source module includes a second reflective sheet and a plurality of second light strips mounted on the second sub back plate, the second reflective sheet is provided with a plurality of second through holes, each second through hole corresponds to one light bead on the second light strips;

a light reflectivity of the first reflective sheet is greater than that of the second reflective sheet.

Preferably, the first light source module includes a first reflective sheet and a plurality of first light strips mounted on the first sub back plate, the first reflective sheet is provided with a plurality of first through holes, each first through hole corresponds to one light bead on the first light strips;

the second light source module includes a second reflective sheet and a plurality of second light strips mounted on the second sub back plate, the second reflective sheet is provided with a plurality of second through holes, each second through hole corresponds to one light bead on the second light strips;

an aperture of the first through hole is smaller than that of the second through hole.

Preferably, the first reflective sheet is connected with the second reflective sheet through a third reflective sheet, and a connecting portion between the third reflective sheet and the first reflective sheet and a connecting portion between the third reflective sheet and the second reflective sheet both are transited smoothly.

Preferably, both the first light source module and the second light source module include a plurality of light strips, and a density of the light strips on the first sub back plate is greater than that on the second sub back plate.

Preferably, the first light source module includes a plurality of first light strips, the second light source module includes a plurality of second light strips, and a density of the light beads on the first light strip is greater than that on the second light strip.

Preferably, the first light source module includes a plurality of first light strips, the second light source module includes a plurality of second light strips, the first light strip is provided with a plurality of first lens, each first lens corresponds to one first light bead on the first light strip, the second light strip is provided with a plurality of second lens, each second lens corresponds to one second light bead on the second light strip, and a light transmission angle of the first lens is greater than that of the second lens.

The present disclosure further provides a display device, including a direct type backlight module, the direct type backlight module includes:

a back plate, including a body and a side plate protruding around an edge of the body, the body and the side plate are enclosed to form a receiving cavity, and a back surface of the body is partially recessed towards the receiving cavity to form a mounting groove; and a rear housing, covering the mounting groove, and a back surface of the rear housing is flush with an edge of the mounting groove of the body.

In the technical solution of the present disclosure, a back surface of a body is partially recessed towards a receiving cavity to form a mounting groove, a rear housing covers the mounting groove, and a back surface of the rear housing is flush with an edge of the mounting groove of the body. Therefore, the back side of the direct type backlight module is flat, such that the overall thickness of the display device is relatively uniform. The overall thickness of the display device is reduced, thereby achieving an aesthetic effect of ultra-thin thickness of the display device, and saving space when a user places the display device against the wall, and thus effectively improving the user experience.

BRIEF DESCRIPTION OF THE DRAWINGS

In order to more clearly illustrate the technical solution in the embodiments of the present disclosure or in the prior art, the drawings used in the description of the embodiments or the prior art will be briefly described below. It is obvious that the drawings in the following description are merely some of the embodiments of the present disclosure, and those skilled in the art can obtain other drawings according to the structures shown in these drawings without any creative work.

DESCRIPTION OF REFERENCE SIGNS

| Label | Name |
|---|---|
| 1 | direct type backlight module |
| 10 | back plate |
| 100 | receiving cavity |
| 110 | body |
| 111 | first sub back plate |
| 112 | connecting plate |
| 113 | second sub back plate |
| 120 | side plate |
| 130 | mounting groove |
| 20 | rear housing |
| 210 | movement |
| 220 | circuit board |
| 30 | first light source module |
| 300 | first light strip |
| 310 | first light bead |
| 320 | first lens |
| 330 | first reflective sheet |
| 331 | first through hole |
| 340 | third reflective sheet |
| 40 | second light source module |
| 400 | second light strip |
| 410 | second light bead |
| 420 | second lens |
| 430 | second reflective sheet |
| 431 | second through hole |

The realization of the objective, functional characteristics, advantages of the present disclosure are further described with reference to the accompanying drawings and the embodiments.

DETAILED DESCRIPTION OF THE EMBODIMENTS

The technical solutions in the embodiments of the present disclosure will be clearly and completely described in the following with reference to the accompanying drawings. It is obvious that the described embodiments are merely a part of the embodiments of the present disclosure, and not all of the embodiments. All other embodiments obtained by the ordinary person skilled in the art based on the embodiments of the present disclosure without creative efforts shall fall within the protection scope of the present disclosure.

It should be noted that all directional indications (such as upper, lower, left, right, front, rear) in the embodiments of the present disclosure are only used to explain the relative positional relationship, motion, and the like between the components in a certain posture (as shown in the drawings). If the certain posture changes, the directional indication also changes accordingly.

Besides, the descriptions of "first", "second" and the like in the present disclosure are merely used for description, and are not to be construed as indicating or implying their relative importance or implicitly indicating a number of technical features indicated. Thus, the features defining "first" or "second" may include at least one of the features, either explicitly or implicitly. In addition, the technical solutions between the various embodiments may be combined with each other, but which shall be able to be implemented by the ordinary person skilled in the art. When the combination of the technical solutions is contradictory or impossible to be achieved, it should be considered that the combination of such technical solutions does not exist and is not within the protection scope of the present disclosure.

The present disclosure provides a direct type backlight module for a display device. The display device mainly refers to a device having a liquid crystal display screen such as a television or a computer display screen. It should be noted that, in the drawing of the present disclosure, the coordinate system is established based on the posture of the assembled direct type backlight module when in use, in which a vertical direction is an up-and-down direction of the direct type backlight module, a front direction is a direction towards the user and a rear direction is a direction back to the user.

In an embodiment of the present disclosure, referring to FIG. 1 to FIG. 5, the direct type backlight module includes:

a back plate 10, including a body 110 and a side plate 120 protruding around an edge of the body 110, the body 110 and the side plate 120 are enclosed to form a receiving cavity 100, and a back surface of the body 110 is partially recessed towards the receiving cavity 100 to form a mounting groove 130; and a rear housing 20, covering the mounting groove 130, and a back surface of the rear housing 20 is flush with an edge of the mounting groove 130 of the body 110.

Generally, in the existing display device, the body 110 of the back plate 10 is generally plate-like, and the surface of the back plate 10 is relatively flat. When the rear housing 20 is mounted on a surface of bottom plate opposite to the side plate 120 of the receiving cavity 100, the rear housing 20 is convex with respect to the body 110, thereby causing uneven thickness of the television. When the rear housing 20 on the back side of the display device protrudes outwardly, which results in that the back side of the display device occupies a large space, and the interval between the back side of the display device and the wall is correspondingly large, which causing a poor space utilization rate and a fatigue aesthetic of the user.

However, in the present embodiment, a back surface of the body 110 is partially recessed towards the receiving cavity 100 to form the mounting groove 130; and the rear housing 20 covers the mounting groove 130. At this time, a device such as a circuit board 220 and a movement 210 is disposed in the mounting groove 130, in which the circuit board 220 and the movement 210 are fixed to the back surface of the body 110, when the rear housing 20 covers the mounting groove 130, the device such as the movement 210 and the circuit board 220 is isolated from the outside. The rear housing 20 may be fixedly connected to the body 110 by a detachable structure such as a screw or a buckle. It should be noted that when the rear housing 20 is mounted on the back plate 10, in order to make the back side surface of the direct type backlight module 1 relatively flat and prevent the rear housing 20 from protruding, the back surface of the rear housing 20 is flush with the edge of the mounting groove 130 of the body 110. As such, the rear housing 20 is effectively received in the mounting groove through the above structure, such that the back side of the direct type backlight module 1 may form a flat surface, thereby reducing the overall thickness of the display device and greatly improving the appearance of the display device.

It should be noted that, generally, the back plate 10 is made of sheet metal, and the thickness of the back plate 10 is relatively uniform. The mounting groove 130 may be made by a stamping process, that is, the body 110 is punched towards a side of the receiving cavity 100 by a sheet metal stamping apparatus to form the above-described mounting groove 130. It is obvious that, in other embodiments, the back plate 10 may also be made by other processes, for example, the back plate 10 is a casting formed by a casting process, etc., and it will not be further described herein. In the direct type backlight module 1, the device such as the movement 210 and the circuit board 220 is generally disposed in the lower region of the body 110, therefore, the above-mentioned mounting groove 130 should also be located in the lower region of the body 110. It is obvious that, in other embodiments, the movement 210 and the circuit board 220 may also be disposed at the middle or the upper region of the body 110, and the mounting groove 130 is also formed in the middle or upper region of the body 110, and is not specifically limited herein.

In the technical solution of the present disclosure, a back surface of a body 110 is partially recessed towards a receiving cavity to form a mounting groove 130, a rear housing 20 covers the mounting groove 130, and a back surface of the rear housing 20 is flush with an edge of the mounting groove 130 of the body 110. Therefore, the back side of the direct type backlight module 1 is flat, such that the overall thickness of the display device is relatively uniform. The overall thickness of the display device is reduced, thereby achieving an aesthetic effect of ultra-thin thickness of the display device, and saving space when a user places the display device against the wall, and thus effectively improving the user experience.

Furthermore, in the present embodiment, the body 110 includes a first sub back plate 111, a connecting plate 112 and a second sub back plate 113 connected sequentially, the first sub back plate 111 is parallel to the second sub back plate 113, an angle between the first sub back plate 111 and the connecting plate 112 is an obtuse angle, and the second sub back plate 113 is a bottom plate of the mounting groove. It should be noted that because a side of the back plate 10 towards the mounting cavity is provided with a light-emitting structure for providing a light source to the liquid crystal screen of the direct type backlight module 1, the bottom plate should be relatively flat to facilitate uniformity of light emitting; because the second sub back plate 113 protrudes from the first sub back plate 111 in the body 110 in the direction of the receiving cavity 100, in order to balance the need for uniformity of light emitting, the first sub back plate 111 is parallel to the second sub back plate 113 such that the light-emitting angles and directions of the light sources disposed on the first sub back plate 111 and the second sub back plate 113 are identical.

Figure 1:
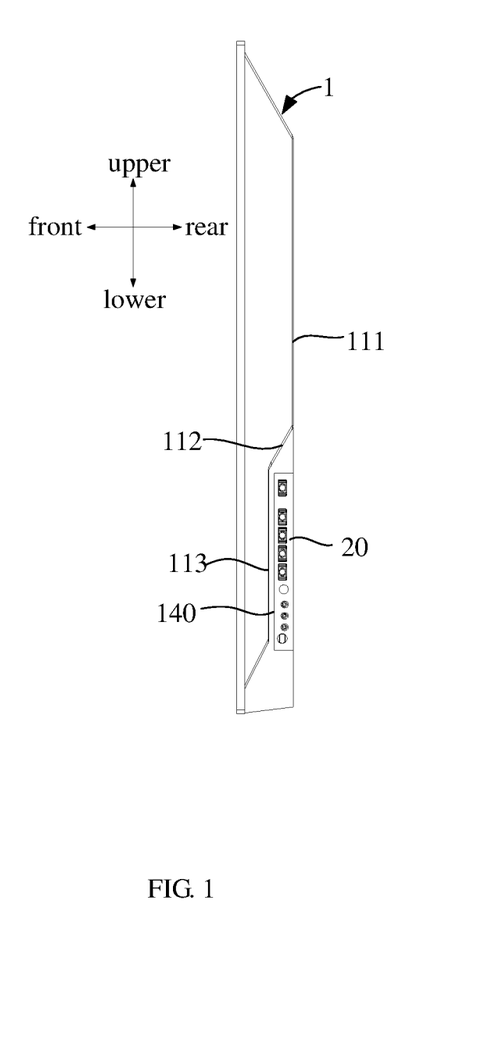
FIG. 1 is a schematic structural view of a direct type backlight module from a perspective of an embodiment of the present disclosure.
Figure 2:
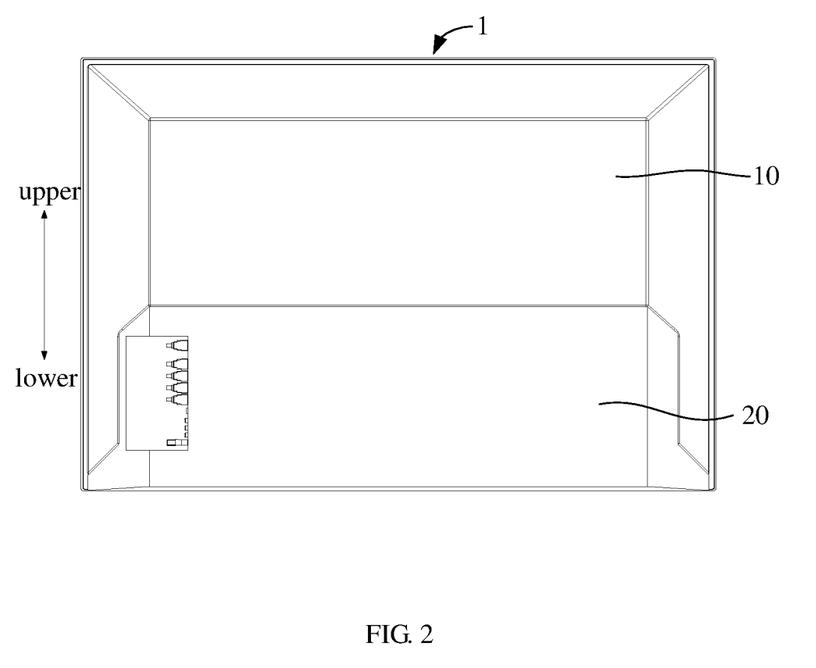
FIG. 2 is a schematic structural view of the direct type backlight module from another perspective in FIG. 1.
Figure 3:
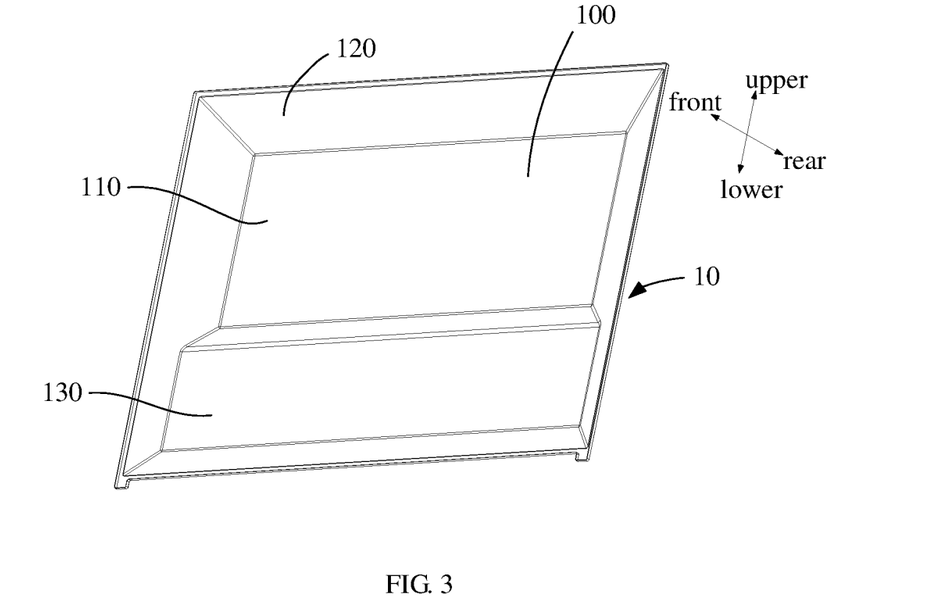
FIG. 3 is a schematic structural view of the back plate from a perspective in FIG. 1.
Figure 4:
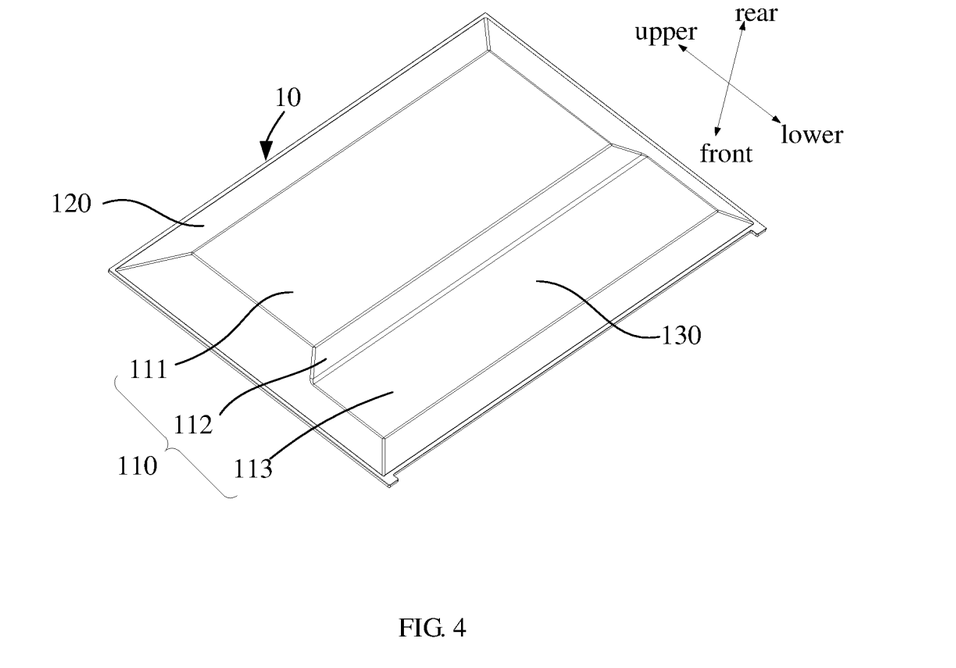
FIG. 4 is a schematic structural view of the back plate from another perspective in FIG. 1.
Figure 5:
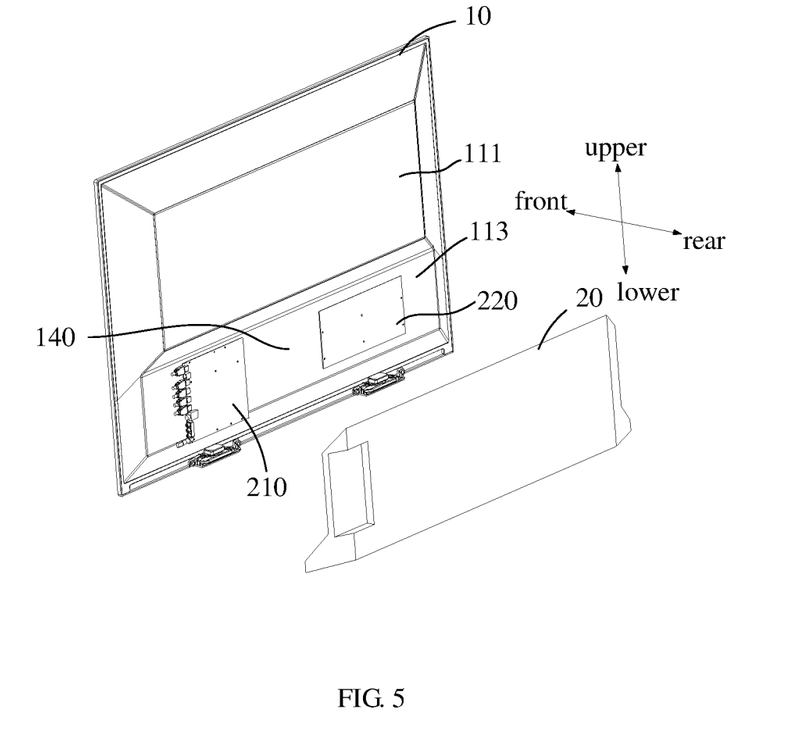
FIG. 5 is a schematic view showing the installation of the back plate and the rear housing in FIG. 1.
Figure 6:
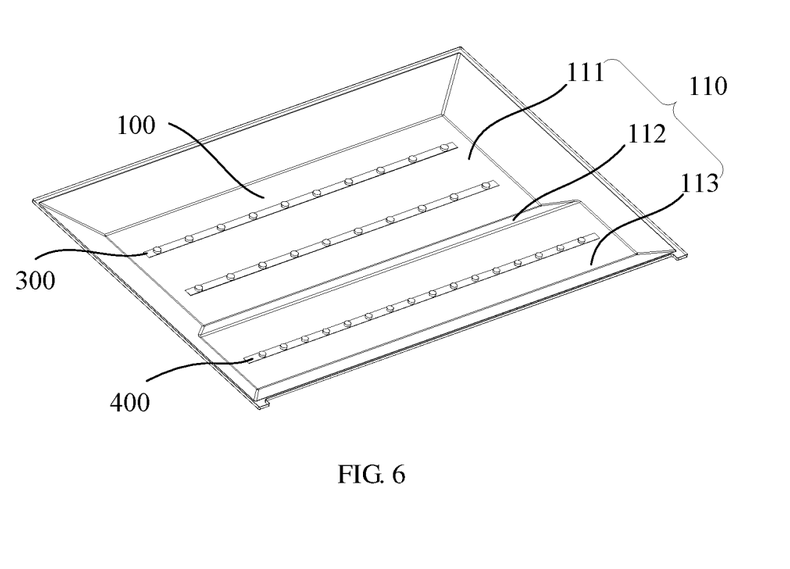
FIG. 6 is a schematic view showing the installation of a light strip and a back plate of the direct type backlight module of an embodiment of the present disclosure.
Figure 7:
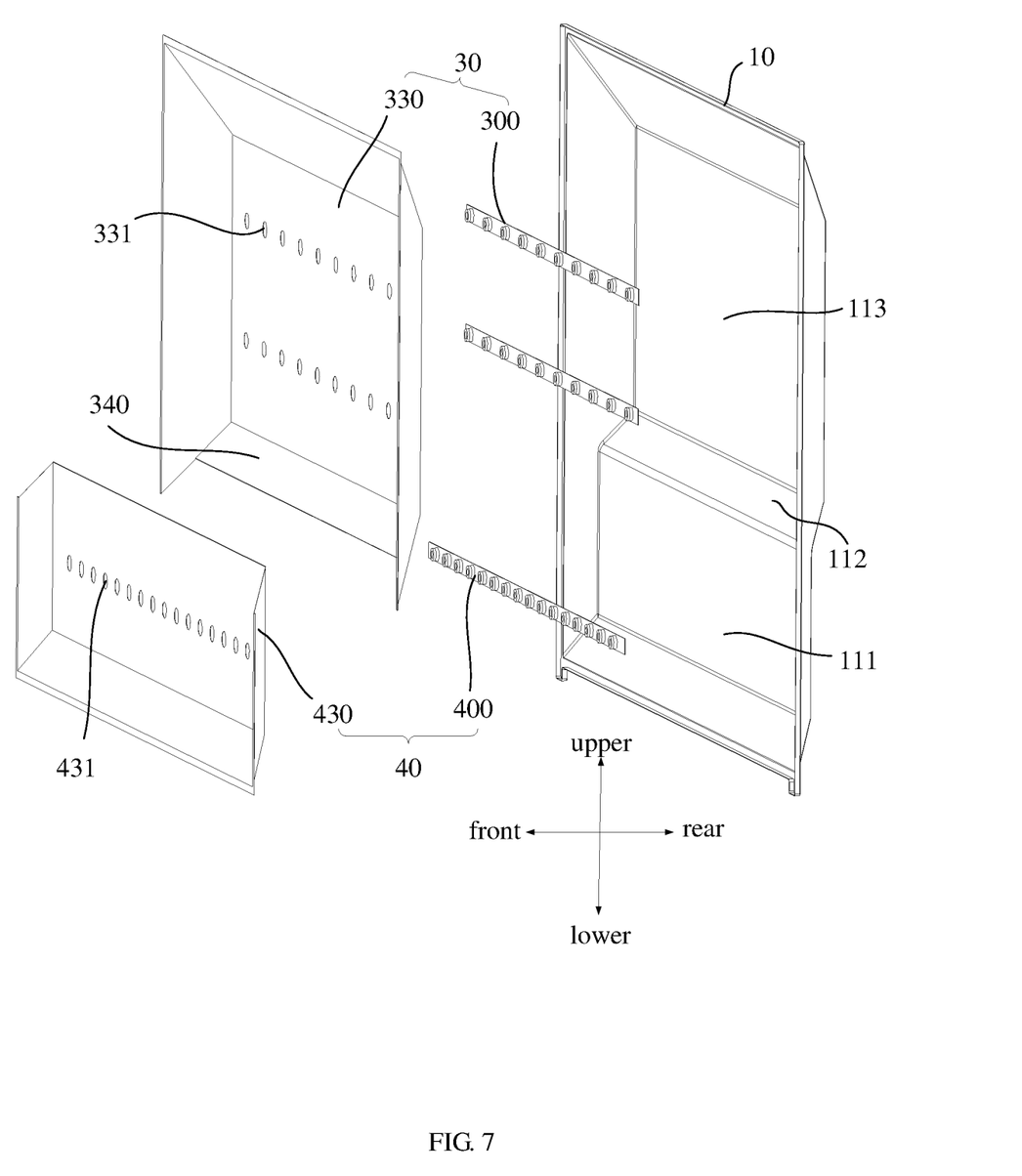
FIG. 7 is an exploded view of the direct type backlight module from a perspective of an embodiment of the present disclosure.

Referring to FIG. 6 and FIG. 7, in the present embodiment, the direct type backlight module 1 further includes a first light source module 30 disposed on the first sub back plate 111 and a second light source module 40 disposed on the second sub back plate 113, a luminance of the first light source module 30 is greater than that of the second light source module 40. It should be appreciated that the second sub back plate 113 protrudes from the first sub back plate 111 in the body 110 in the direction of the receiving cavity 100. Since the light intensity and the luminance are inversely proportional to the light propagation distance, in order to keep the luminance and intensity of the light emitted from the first sub back plate 111 and the second sub back plate 113 uniform, the luminance of the first light source module 30 is greater than that of the second light source module 40, thereby reducing the difference of the luminance between the first sub back plate 111 and the second sub back plate 113.

In order to make the luminance of the first light source module 30 greater than that of the second light source module 40, thereby reducing the difference of the luminance between the first sub back plate 111 and the second sub back plate 113, there are many ways to do this. Hereinafter, several embodiments for realizing that the luminance of the first light source module 30 is greater than that of the second light source module 40 will be specifically described.

In an embodiment, referring to FIG. 0.7 again, the first light source module 30 includes a first reflective sheet 330 and a plurality of first light strips 300 mounted on the first sub back plate 111, the first reflective sheet 330 is provided with a plurality of first through holes 331, each first through hole 331 corresponds to one light bead on the first light strips 300; the second light source module 40 includes a second reflective sheet 430 and a plurality of second light strips 400 mounted on the second sub back plate 113, the second reflective sheet 430 is provided with a plurality of second through holes 431, each second through hole 431 corresponds to one light bead on the second light strips 400; a light reflectivity of the first reflective sheet 330 is greater than that of the second reflective sheet 430. As such, the concentrated reflection effect of the first reflective sheet 330 on the light is stronger than that of the second reflective sheet 430 on the light. Compared with the second reflective sheet 430, the luminance of the first reflective sheet 330 is significantly enhanced, thereby reducing the difference of the luminance between the first reflective sheet 330 and the second reflective sheet 430 to balance the overall luminance. The first reflective sheet 330 and the second reflective sheet 430 may have different light reflectivity by applying reflective coatings having different reflective properties on the surface thereof.

It should be noted that, the first reflective sheet 330 is connected with the second reflective sheet 430 through a third reflective sheet 340, and a connecting portion between the third reflective sheet 340 and the first reflective sheet 330 and a connecting portion between the third reflective sheet 340 and the second reflective sheet 430 both are transited smoothly. The third reflective sheet 340 is disposed at the connecting plate 112 of the body 110. By providing a connecting portion between the third reflective sheet 340 and the first reflective sheet 330 and a connecting portion between the third reflective sheet 340 and the second reflective sheet 430 both transited smoothly, it is effective to prevent a clear light band or a dark band from being formed at the connecting portion between the first reflective sheet 330 and the third reflective sheet 340 and at the connecting portion between the second reflective sheet 430 and the third reflective sheet 340, thereby improving the uniformity of light emitting. Meanwhile, it should be emphasized that the first reflective sheet 330, the second reflective sheet 430, and the third reflective sheet 340 may be integrally disposed, or may be disposed separately from each other; alternatively, one of the first reflective sheet 330 and the second reflective sheet 430 is integrally disposed with the third reflective sheet 340, and the other one of the first reflective sheet 330 and the second reflective sheet 430 is separately disposed with the third reflective sheet 340.

In the aforementioned embodiments, in addition to adjusting the light reflectivity of the first reflective sheet 330 and the second reflective sheet 430, the luminance of the first light source module 30 being greater than that of the second light source module 40 may also be achieved by changing an aperture of the first through hole 331 and the second through hole 431. Specifically, the aperture of the first through hole 331 is smaller than that of the second through hole 431, when the light bead on the second light strip 400 may emit light, since the aperture of the second through hole 431 is large, a part of the light is radiated from the second through hole 431 towards the side of the body 110, thereby forming a certain light leakage phenomenon, thus effectively reducing the luminance of the second light source module 30. As such, compared with the first reflective sheet 330, the luminance of the second reflective sheet 430 is significantly weakened, thereby reducing the difference of the luminance between the first reflective sheet 330 and the second reflective sheet 430 to balance the overall luminance.

In another embodiment, referring to FIG. 6, both the first light source module 30 and the second light source module 40 include a plurality of light strips, and a density of the light strips on the first sub back plate 111 is greater than that on the second sub back plate 113. The uniformity of overall luminance is balanced by adjusting the luminance of self-illuminating body in the first light source module 30 and the second light source module 40. In the same manner, referring to FIG. 6, in some other embodiments, the first light source module 30 includes a plurality of first light strips 300, the second light source module 40 includes a plurality of second light strips 400, and a density of the light beads on the first light strip 300 is greater than that on the second light strip 400. Thus, the uniformity of overall luminance is balanced by adjusting the luminance of the first light strip 300 and the second light strip 400.

Figure 8:
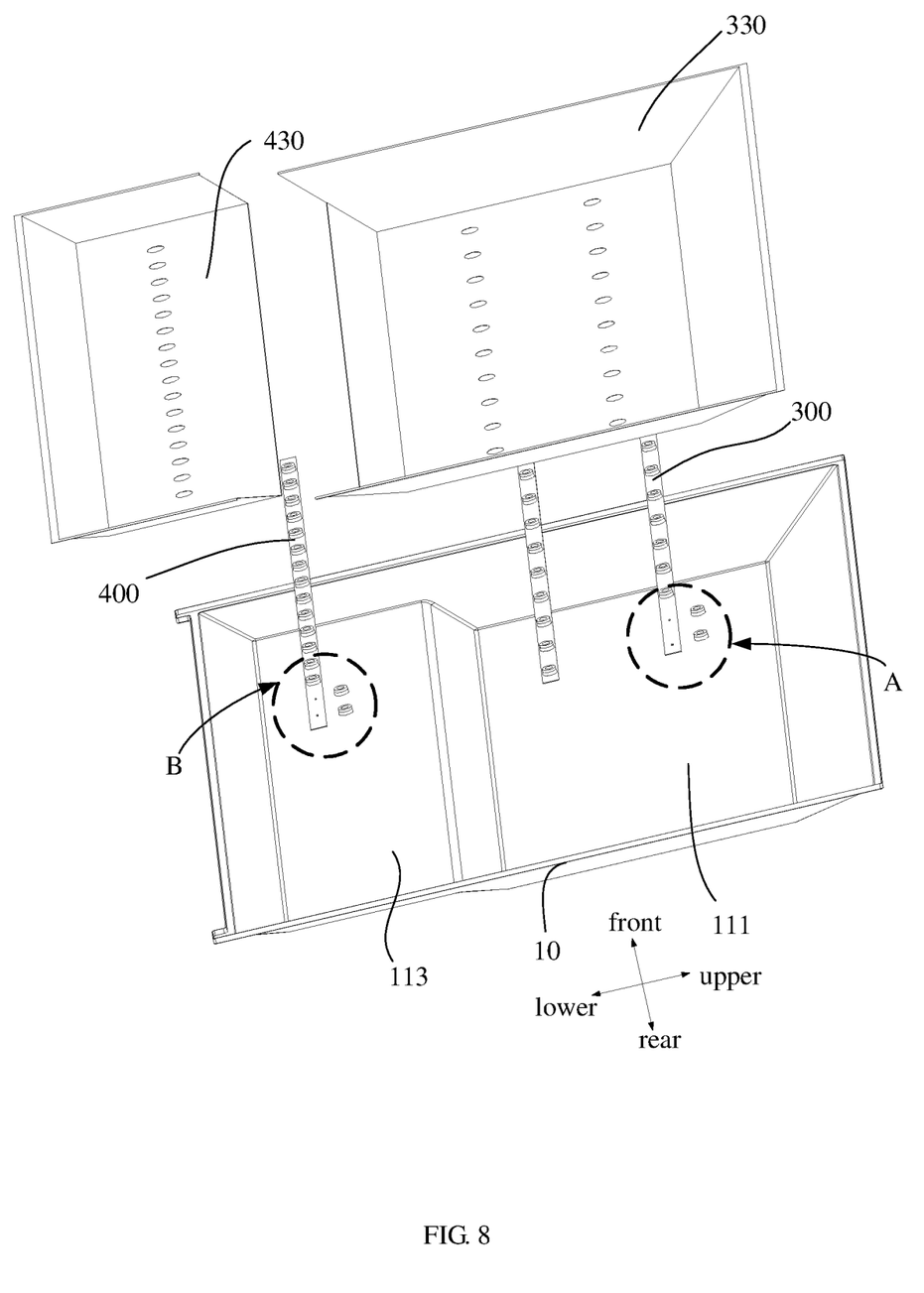
FIG. 8 is an exploded view of the direct type backlight module from another perspective in FIG. 7.
Figure 9:
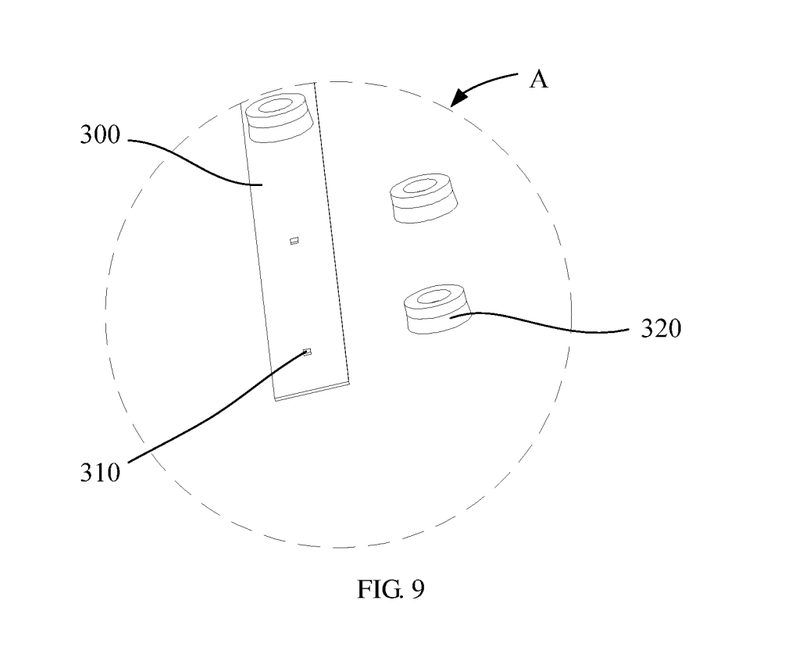
FIG. 9 is an enlarged view of portion A in FIG. 8.
Figure 10:
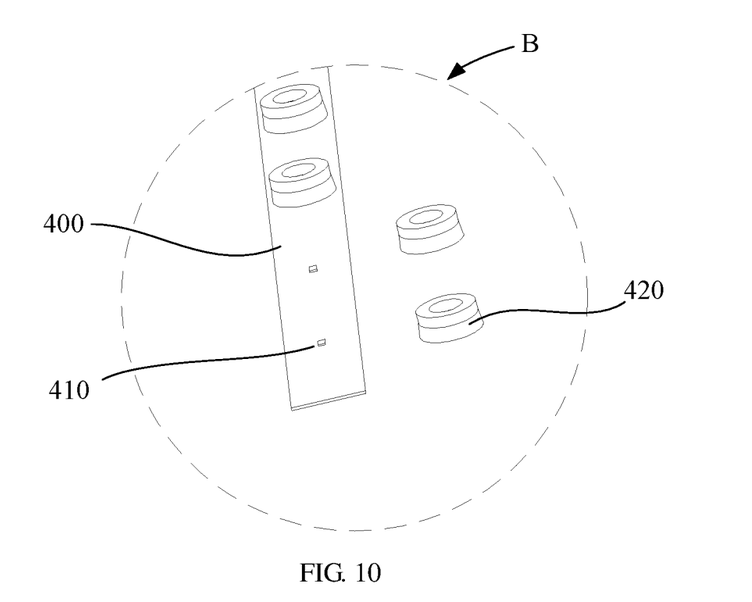
FIG. 10 is an enlarged view of portion B in FIG. 8.

Referring to FIG. 8 to FIG. 10, the first light source module 30 includes a plurality of first light strips 300, the second light source module includes a plurality of second light strips 400, the first light strip 300 is provided with a plurality of first lens 320, each first lens 320 corresponds to one first light bead 310 on the first light strip 300, the second light strip 400 is provided with a plurality of second lens 420, each second lens 420 corresponds to one second light bead 410 on the second light strip 400, and a light transmission angle of the first lens 320 is greater than that of the second lens 420. As such, by using different types of lenses, when the light emitted by the second bead 410 is emitted through the second lens 420, the light is greatly dispersed, so that the luminance of the second bead 410 is effectively reduced, the luminance of the first light source module 30 is greater than that of the second light source module 40 to increase the uniformity of light emitting.

Furthermore, in order to achieve that the luminance of the first light source module 30 is greater than that of the second light source module 40, when the first light source module 30 and the second light source module 40 use the same size and type of illuminant, by adjusting the power supply voltage or current of the illuminant, when the power supply voltage and current are larger, the luminance of the illuminant is higher. In this way, the luminance of the first light source module 30 may also be made larger than that of the second light source module 40.

The present disclosure also provides a display device, the display device includes a direct type backlight module, and the specific structure of the direct type backlight module refers to the above embodiments. Since the display device adopts all the technical solutions of all the above embodiments, at least all the beneficial effects brought by the technical solutions of the foregoing embodiments are not repeatedly described herein.

The above embodiments are only the preferred embodiments of the present disclosure and are not therefore limiting the scope of the present disclosure. Any equivalent structure or process change made by using the contents of the present specification and drawings, or directly or indirectly applied in other related technical fields, shall be included in the protection scope of the present disclosure.

What is claimed is:

1. A direct type backlight module, applied to a display device, wherein the direct type backlight module comprises:
    a back plate, comprising a body and a side plate protruding around an edge of the body, the body and the side plate are enclosed to form a receiving cavity, and a back surface of the body is partially recessed towards the receiving cavity to form a mounting groove; and
    a rear housing, covering the mounting groove, and a back surface of the rear housing is flush with an edge of the mounting groove of the body,
    wherein the body comprises a first sub back plate, a second sub back plate parallel to the first sub back plate, and a connecting plate connected therebetween, and an angle between the first sub back plate and the connecting plate is an obtuse angle.

2. The direct type backlight module of claim 1, wherein the second sub back plate is a bottom plate of the mounting groove.

3. The direct type backlight module of claim 2, wherein the direct type backlight module further comprises a first light source module disposed on the first sub back plate and a second light source module disposed on the second sub back plate, and a luminance of the first light source module is greater than that of the second light source module.

4. The direct type backlight module of claim 3, wherein the first light source module comprises a first reflective sheet and a plurality of first light strips all mounted on the first sub back plate, the first reflective sheet is provided with a plurality of first through holes, each first through hole corresponds to one light bead on the first light strips;
    the second light source module comprises a second reflective sheet and a plurality of second light strips all mounted on the second sub back plate, the second reflective sheet is provided with a plurality of second through holes, each second through hole corresponds to one light bead on the second light strips; and
    a light reflectivity of the first reflective sheet is greater than that of the second reflective sheet.

5. The direct type backlight module of claim 4, wherein the first reflective sheet is connected with the second reflective sheet through a third reflective sheet, and a connecting portion between the third reflective sheet and the first reflective sheet and a connecting portion between the third reflective sheet and the second reflective sheet both are transited smoothly.

6. The direct type backlight module of claim 3, wherein the first light source module comprises a first reflective sheet and a plurality of first light strips all mounted on the first sub back plate, the first reflective sheet is provided with a plurality of first through holes, each first through hole corresponds to one light bead on the first light strips;

the second light source module comprises a second reflective sheet and a plurality of second light strips all mounted on the second sub back plate, the second reflective sheet is provided with a plurality of second through holes, each second through hole corresponds to one light bead on the second light strips; and an aperture of the first through hole is smaller than that of the second through hole.

7. The direct type backlight module of claim 6, wherein the first reflective sheet is connected with the second reflective sheet through a third reflective sheet, and a connecting portion between the third reflective sheet and the first reflective sheet and a connecting portion between the third reflective sheet and the second reflective sheet both are transited smoothly.

8. The direct type backlight module of claim 3, wherein both the first light source module and the second light source module comprise a plurality of light strips, and a density of the light strips on the first sub back plate is greater than that on the second sub back plate.

9. The direct type backlight module of claim 3, wherein the first light source module comprises a plurality of first light strips, the second light source module comprises a plurality of second light strips, and a density of the light beads on the first light strip is greater than that on the second light strip.

10. The direct type backlight module of claim 3, wherein the first light source module comprises a plurality of first light strips, the second light source module comprises a plurality of second light strips, the first light strip is provided with a plurality of first lens, each first lens corresponds to one first light bead on the first light strip, the second light strip is provided with a plurality of second lens, each second lens corresponds to one second light bead on the second light strip, and a light transmission angle of the first lens is greater than that of the second lens.

11. A display device, wherein the display device comprises a direct type backlight module, the direct type backlight module comprises:

a back plate, comprising a body and a side plate protruding around an edge of the body, the body and the side plate are enclosed to form a receiving cavity, and a back surface of the body is partially recessed towards the receiving cavity to form a mounting groove; and a rear housing, covering the mounting groove, and a back surface of the rear housing is flush with an edge of the mounting groove of the body, wherein the body comprises a first sub back plate, a second sub back plate parallel to the first sub back plate, and a connecting plate connected therebetween, and an angle between the first sub back plate and the connecting plate is an obtuse angle.

12. The display device of claim 11, wherein the second sub back plate is a bottom plate of the mounting groove.

13. The display device of claim 12, wherein the direct type backlight module further comprises a first light source module disposed on the first sub back plate and a second light source module disposed on the second sub back plate, and a luminance of the first light source module is greater than that of the second light source module.

14. The display device of claim 13, wherein the first light source module comprises a first reflective sheet and a plurality of first light strips all mounted on the first sub back plate, the first reflective sheet is provided with a plurality of first through holes, each first through hole corresponds to one light bead on the first light strips;

the second light source module comprises a second reflective sheet and a plurality of second light strips all mounted on the second sub back plate, the second reflective sheet is provided with a plurality of second through holes, each second through hole corresponds to one light bead on the second light strips; and a light reflectivity of the first reflective sheet is greater than that of the second reflective sheet.

15. The display device of claim 14, wherein the first reflective sheet is connected with the second reflective sheet through a third reflective sheet, and a connecting portion between the third reflective sheet and the first reflective sheet and a connecting portion between the third reflective sheet and the second reflective sheet both are transited smoothly.

16. The display device of claim 13, wherein the first light source module comprises a first reflective sheet and a plurality of first light strips all mounted on the first sub back plate, the first reflective sheet is provided with a plurality of first through holes, each first through hole corresponds to one light bead on the first light strips;

the second light source module comprises a second reflective sheet and a plurality of second light strips all mounted on the second sub back plate, the second reflective sheet is provided with a plurality of second through holes, each second through hole corresponds to one light bead on the second light strips; and an aperture of the first through hole is smaller than that of the second through hole.

17. The display device of claim 16, wherein the first reflective sheet is connected with the second reflective sheet through a third reflective sheet, and a connecting portion between the third reflective sheet and the first reflective sheet and a connecting portion between the third reflective sheet and the second reflective sheet both are transited smoothly.

18. The display device of claim 13, wherein both the first light source module and the second light source module comprise a plurality of light strips, and a density of the light strips on the first sub back plate is greater than that on the second sub back plate.

19. The display device of claim 13, wherein the first light source module comprises a plurality of first light strips, the second light source module comprises a plurality of second light strips, and a density of the light beads on the first light strip is greater than that on the second light strip.

20. The display device of claim 13, wherein the first light source module comprises a plurality of first light strips, the second light source module comprises a plurality of second light strips, the first light strip is provided with a plurality of first lens, each first lens corresponds to one first light bead on the first light strip, the second light strip is provided with a plurality of second lens, each second lens corresponds to one second light bead on the second light strip, and a light transmission angle of the first lens is greater than that of the second lens.

* * * * *